(12) United States Patent
Buendia Hernandez

(10) Patent No.: US 11,840,141 B2
(45) Date of Patent: Dec. 12, 2023

(54) VEHICLE DRIVE TRAIN ASSEMBLY

(71) Applicant: NISSAN NORTH AMERICA, INC., Franklin, TN (US)

(72) Inventor: Rodrigo Javier Buendia Hernandez, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 157 days.

(21) Appl. No.: 17/306,607

(22) Filed: May 3, 2021

(65) Prior Publication Data
US 2022/0348075 A1 Nov. 3, 2022

(51) Int. Cl.
*B60K 17/24* (2006.01)
*F16C 3/02* (2006.01)

(52) U.S. Cl.
CPC ............. *B60K 17/24* (2013.01); *F16C 3/023* (2013.01)

(58) Field of Classification Search
CPC ...... F16B 31/021; F16B 37/061; F16B 29/00; F16B 39/34; B60K 17/24; F16C 3/023
USPC ........................................................ 411/972
See application file for complete search history.

(56) References Cited

U.S. PATENT DOCUMENTS

| | | | | |
|---|---|---|---|---|
| 954,010 A | * | 4/1910 | Alt | F16B 39/24 411/138 |
| 1,289,710 A | * | 12/1918 | Ervin | F16B 39/32 411/328 |
| 2,390,726 A | * | 12/1945 | Mitchell | F16B 39/34 411/302 |
| 2,393,436 A | * | 1/1946 | Wallace | F16B 37/044 411/106 |
| 2,393,764 A | * | 1/1946 | Frank | F16B 39/32 269/174 |
| 2,404,372 A | * | 7/1946 | Hallock | F16B 37/044 411/113 |
| 3,045,736 A | * | 7/1962 | Howe | F16B 37/061 470/22 |
| 3,175,462 A | * | 3/1965 | Disley | F16B 29/00 411/968 |
| 3,319,689 A | * | 5/1967 | McDougall | F16B 39/34 411/944 |
| 3,325,196 A | * | 6/1967 | Noirot | F16B 43/00 403/247 |
| 4,230,166 A | * | 10/1980 | Layeillon | F16B 39/26 411/302 |
| 4,729,703 A | * | 3/1988 | Sato | F16B 39/12 411/238 |
| 4,776,737 A | * | 10/1988 | Wollar | F16B 35/044 411/908 |
| 4,836,727 A | * | 6/1989 | Volkmann | F16B 31/021 411/432 |

(Continued)

OTHER PUBLICATIONS

Weld nut designs, Apr. 30, 2021.

*Primary Examiner* — Paul N Dickson
*Assistant Examiner* — Timothy Wilhelm
(74) *Attorney, Agent, or Firm* — Global IP Counselors, LLP

(57) ABSTRACT

A vehicle drive train assembly includes a propeller shaft and a nut. The nut has a first part and a second part. The first part is movable with respect to the propeller between an uninstalled position and an installed position of the nut. The second part is stationary with respect to the propeller shaft in the uninstalled position and the installed position.

11 Claims, 4 Drawing Sheets

(56) References Cited

U.S. PATENT DOCUMENTS

| | | | | |
|---|---|---|---|---|
| 4,875,817 A * | 10/1989 | Suzumura | | F16B 37/14 411/429 |
| 5,865,581 A * | 2/1999 | Sadri | | F16B 31/021 411/432 |
| 6,113,499 A * | 9/2000 | Braun | | B60K 17/22 464/183 |
| 6,250,975 B1 * | 6/2001 | LaPointe | | H01R 4/64 439/883 |
| 6,390,156 B1 * | 5/2002 | Hetherington | | A23G 9/28 141/2 |
| 7,270,509 B2 * | 9/2007 | Disantis | | F16B 39/282 411/332 |
| 7,299,725 B2 * | 11/2007 | Helstern | | F16B 31/021 81/468 |
| 7,811,038 B2 * | 10/2010 | Jimenez | | F16B 39/32 411/326 |
| 8,100,617 B2 * | 1/2012 | Cymbal | | F16B 39/12 411/222 |
| 8,267,630 B2 * | 9/2012 | Moon | | F16B 39/06 411/110 |
| 8,292,373 B2 * | 10/2012 | Rieger | | B60B 27/001 301/105.1 |
| 8,387,260 B2 * | 3/2013 | Quentin | | A47J 43/26 30/120.1 |
| 8,403,611 B2 * | 3/2013 | Friesen | | F16B 39/32 411/533 |
| 8,486,508 B2 * | 7/2013 | Christ | | B23K 35/0288 228/114.5 |
| 8,678,436 B2 * | 3/2014 | Duffy | | B62D 1/195 280/777 |
| 8,858,142 B2 * | 10/2014 | Suzuki | | H01R 11/20 411/184 |
| 9,022,709 B2 * | 5/2015 | Benzing | | F16B 39/32 411/150 |
| 9,051,958 B2 * | 6/2015 | Grojean | | F16B 39/34 |
| 9,062,705 B2 * | 6/2015 | Jimenez | | F16B 41/002 |
| 9,574,599 B2 * | 2/2017 | Marc | | F16B 39/22 |
| 9,841,046 B2 * | 12/2017 | Hess | | F16B 39/34 |
| 10,723,001 B2 * | 7/2020 | Hwang | | B25B 5/14 |
| 11,204,058 B2 * | 12/2021 | Park | | F16B 39/282 |
| 11,493,075 B2 * | 11/2022 | Maloney | | F16B 29/00 |
| 11,499,586 B2 * | 11/2022 | Gong | | F16B 31/02 |
| 2005/0158145 A1 * | 7/2005 | Junkers | | F16B 43/00 411/303 |
| 2006/0137166 A1 * | 6/2006 | Babej | | F16B 37/065 411/181 |
| 2007/0212191 A1 * | 9/2007 | Nilsen | | F16B 37/061 411/162 |
| 2013/0303293 A1 * | 11/2013 | Eckstein | | F16B 31/021 470/8 |
| 2015/0016918 A1 * | 1/2015 | Colombo | | F16B 29/00 411/22 |
| 2016/0084291 A1 * | 3/2016 | Stewart | | F16B 39/32 411/327 |
| 2016/0108968 A1 * | 4/2016 | Koguchi | | F16C 35/077 384/536 |
| 2016/0305465 A1 * | 10/2016 | Hess | | F16B 39/282 |
| 2017/0292557 A1 * | 10/2017 | Sherrill | | F16B 37/04 |
| 2018/0058505 A1 * | 3/2018 | Stack | | F16D 1/10 |
| 2018/0215031 A1 * | 8/2018 | Sundberg | | F16B 43/00 |
| 2019/0048919 A1 * | 2/2019 | Hess | | F16B 39/282 |
| 2022/0186768 A1 * | 6/2022 | Gong | | F16B 31/02 |

* cited by examiner

VEHICLE DRIVE TRAIN ASSEMBLY

BACKGROUND

Technical Field

The present disclosure generally relates to a vehicle drive train assembly. More specifically, the present disclosure relates to a vehicle drive train assembly having one or more torque transmitters.

Background Information

Vehicle propeller shafts connect a vehicle's transmission (e.g., gearbox) to the final drive gears of the vehicle through one or more universal joints and serves as a drive shaft for the vehicle's drive train system. The drive system is an arrangement for transmitting the driving thrust from the road wheels to the vehicle body. The final drive is the transmission system between propeller shaft and a differential mechanism. The differential mechanism is built into the center portion of the final drive. This permits the vehicle's wheels to rotate at different speeds without interfering with the propulsion of the vehicle while taking a turn.

SUMMARY

In view of the state of the known technology, one aspect of the present disclosure is to provide a vehicle drive train assembly comprising a propeller shaft and a nut. The nut has a first part and a second part. The first part is movable with respect to the propeller between an uninstalled position and an installed position of the nut. The second part is stationary with respect to the propeller shaft in the uninstalled position and the installed position.

In view of the state of the known technology, another aspect of the present disclosure is to provide a nut configured to be welded to a vehicle component. The nut comprises a main body, a first extension and a second extension. The main body has a threaded opening for receiving a first fastener. The first extension extends from the main body in a first direction. The second extension extends from the main body in a second direction. The second direction is opposite with respect to the first direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
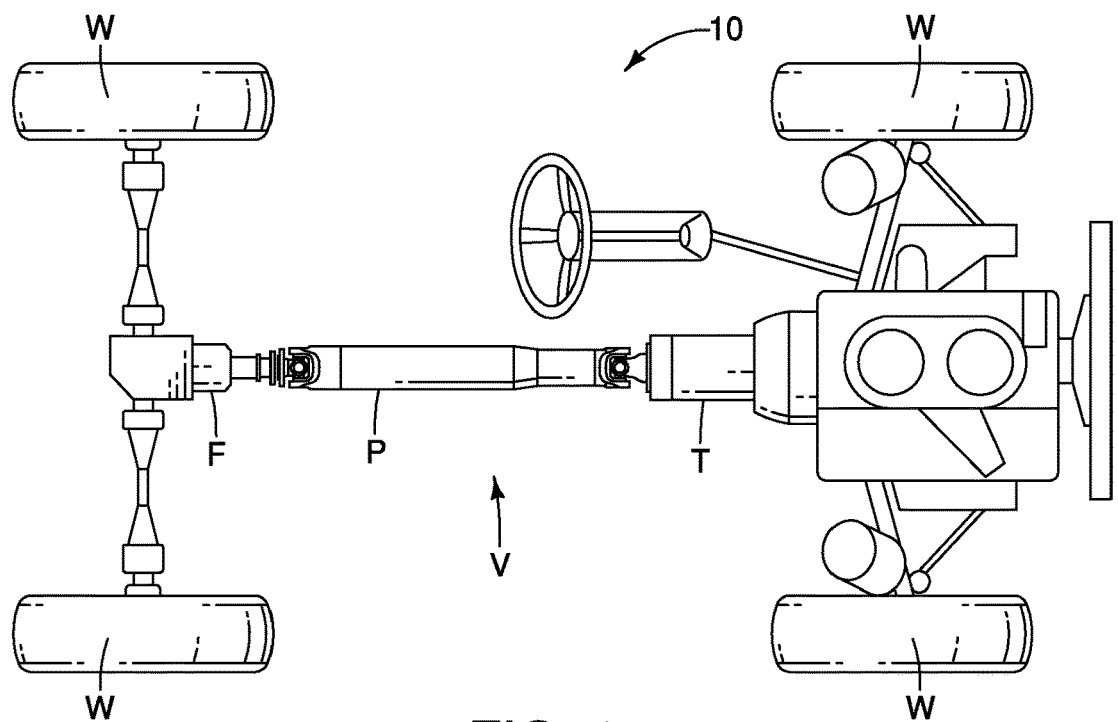
FIG. 1 is a schematic view of a conventional power train assembly.

Referring initially to FIG. 1, a power train assembly 10 for a vehicle is illustrated in accordance with an embodiment. As shown, the power train assembly 10 is an example of a conventional power train assembly that can comprises a drive train assembly that can be implemented with the vehicle. That is, the power train assembly 10 comprises a group of vehicle components V that act to deliver power to the vehicle's driving wheels W. The drive train assembly 12 operates so that power is transferred from the vehicle's crankshaft to a clutch via a flywheel (in a manual transmission T), or to a torque-converter (in an automatic). Power then goes to the vehicle's transmission T which includes a gear box that converts the engine's power into motion. Power is then directed from the transmission T to a propeller shaft P (e.g., a driveline, or carden shaft), which directs the power to a drive axle. The drive axle contains both a final drive F and a differential. The final drive F connects the drive shaft to the differential, which then directs power to each of the vehicle's driving wheels W.

Figure 3:
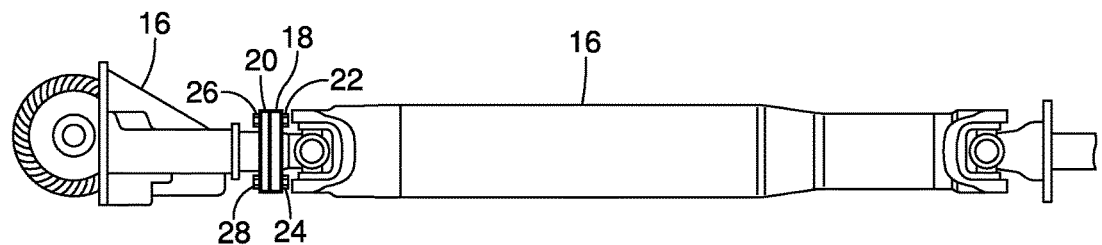
FIG. 3 is a drive train assembly that can be implemented with the power train assembly of FIG. 1.

Referring to FIG. 3, a vehicle drive train assembly 12 that can be implemented with the power train assembly 10 is illustrated. The drive train assembly 12 can include the transmission T, such as the transmission T illustrated in FIG. 1. The drive train assembly 12 of the illustrated embodiment further includes a propeller shaft 14 and a final drive 16, as shown in FIG. 3. In the illustrated embodiment, the propeller shaft 14 and the final dive 16 are considered vehicle components V for transmitting mechanical power and torque and rotation, as will be further described below.

Referring to FIGS. 1 and 3, the propeller shaft 14 can operate to connect the transmission T to the final drive 16 of the vehicle. As shown, the propeller shaft 14 has a longitudinal, tubular section that can be either one of a one-piece or a two-piece construction. The propeller shaft 14 is designed to be a long shaft in order to span between the transmission T and final drive 16. Since the propeller shaft 14 is elongated and designed to operate when the vehicle is traveling at high speeds, the propeller shaft 14 is subject to stress caused by torque transmission.

The final drive 16 comprises an arrangement of a ring gear and a pinion gear. The final drive 16 is positioned downstream of the propeller shaft 14 and the transmission T to transmit torque from the propeller shaft 14 to the vehicle's rear axles. The propeller shaft 14 and the final drive 16 are implemented to connect the other components of the power train assembly 10 that cannot be connected directly because of distance to enable relative movement between the components. Therefore, the propeller shaft 14 and the final drive 16 are considered torque carriers, which are subject to torsion and shear stress. That is, the propeller shaft 14 and the final drive 16 are subject to stress caused by the difference between the input torque and the load to these components.

Figure 4:
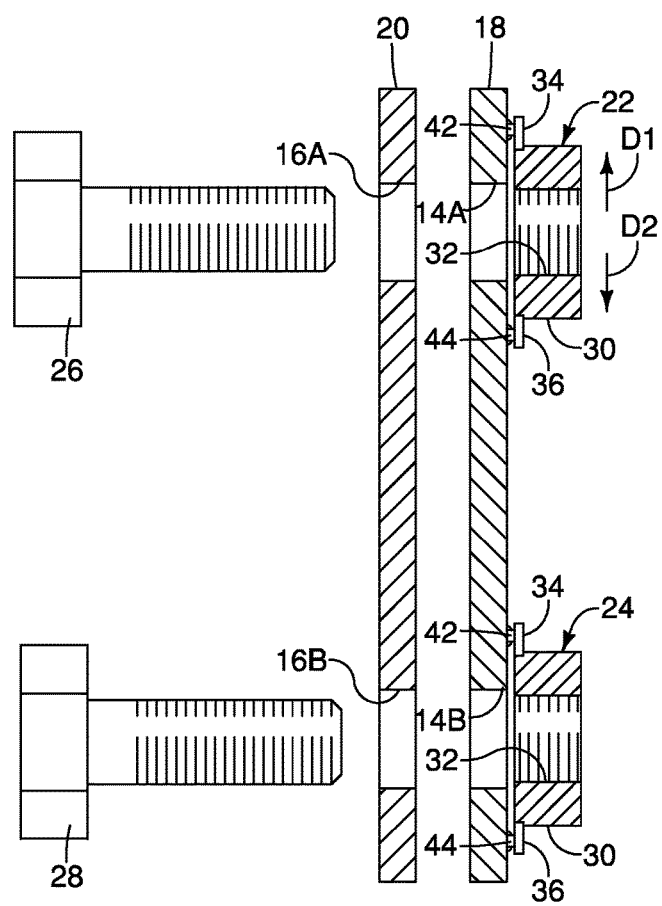
FIG. 4 is a simplified cross-sectional view of a propeller shaft flange and a final drive flange of the drive train assembly of FIG. 3 in an uninstalled state.
Figure 5:
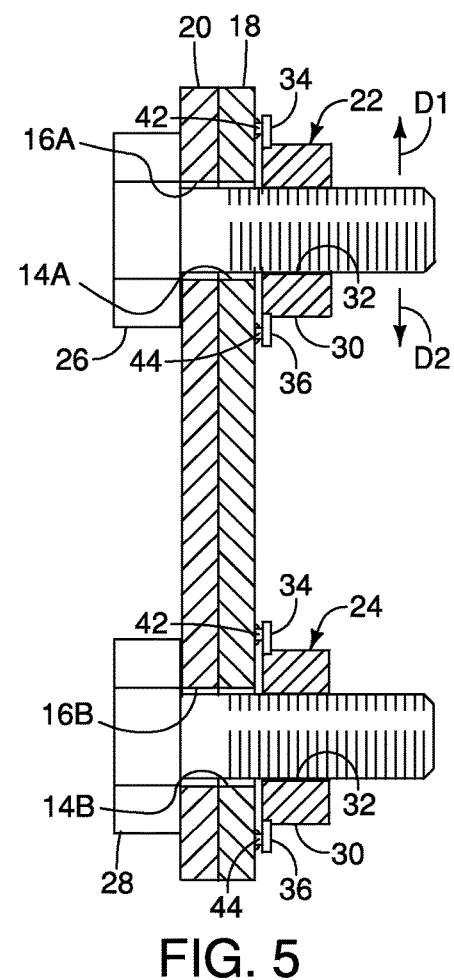
FIG. 5 is a simplified cross-sectional view of the propeller shaft flange and the final drive flange of the drive train assembly of FIG. 3 in another uninstalled state.

As shown, the propeller shaft 14 and the final drive 16 are supported to each other to transfer torque from the transmission T to the drive wheels W. In particular, the propeller shaft 14 has a propeller shaft flange 18, as best seen in FIGS. 3 to 5. The final drive 16 has a final drive flange 20 that is configured to abut and contact the propeller shaft flange 18. That is, the propeller shaft flange 18 and the final drive flange 20 are supported to each other. In other words, the propeller shaft flange 18 is attached to final drive flange 20 to support the propeller shaft 14 and the final drive 16 together.

Figure 2:
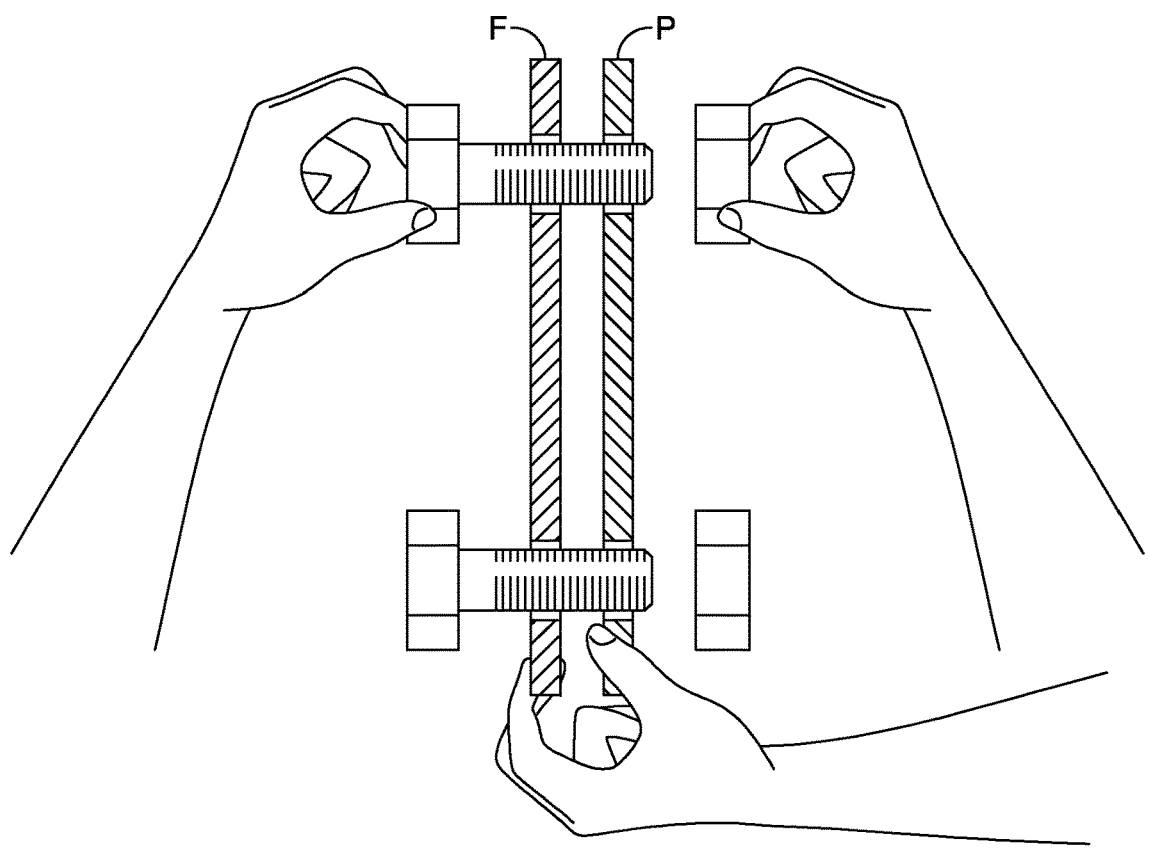
FIG. 2 is a simplified cross-sectional view of some components of the conventional power train assembly of FIG. 1.

Referring to FIG. 2, an example of installation of conventional drive train assembly 12 is illustrated. That is, conventional installation of the propeller shaft and the final drive together typically requires two to three people (or at least three hands) to install the two components together. In particular, at least one hand is needed to hold the propeller shaft flange and the final drive flange 20 together, while at least one other hand installs the fasteners for fastening the propeller shaft flange and the final drive flange. At least one other hand is required to install the nuts that receive the fasteners for securing the fasteners to the propeller shaft flange and the final drive flange.

Due to the heavy weight of the vehicle components V of the drive train assembly 12, such as that of the propeller shaft 14, several installers are typically required in order to install the propeller shaft 14 to the final drive 16. Therefore, with a conventional drive train assembly 12, installation of the propeller shaft and the final drive requires a great deal of time and is a difficult operation in order to carry out the installation process.

Further, the installation of the propeller shaft 14 and the final drive 16 must be secure enough to ensure high torque transmission T from the propeller shaft 14 to the final drive 16 via the propeller shaft flange 18 and the final drive flange 20. Therefore, it is important to tightly attach the propeller shaft flange 18 and the final drive flange 20 together to maintain high friction between the propeller shaft flange 18 and the final drive flange 20 so to prevent torque loss during torque transmission T.

Figure 6:
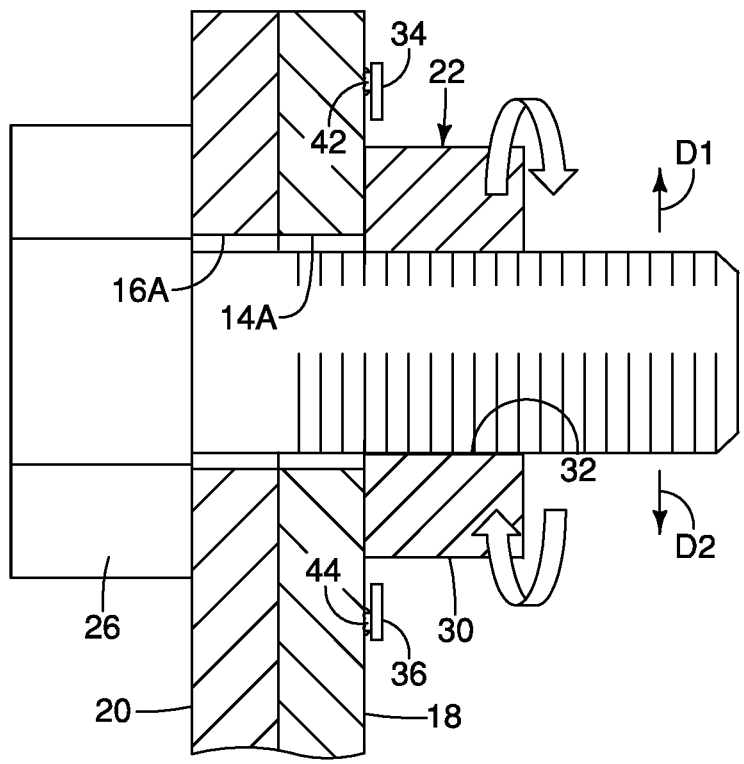
FIG. 6 is a simplified cross-sectional view of the propeller shaft flange and the final drive flange of the drive train assembly of FIG. 3 in an installed state.

Therefore, in the illustrated embodiment, the vehicle drive train assembly 12 further comprises a nut 22 for attaching the propeller shaft 14 and the final drive 16, as will be further described below. The vehicle drive train assembly 12 further comprises a second nut 24. That is, as seen in FIGS. 4 to 6, the vehicle drive train assembly 12 comprises a pair of nuts, the first and second nuts 22 and 24. However, it will be apparent to those skilled in the vehicle field from this disclosure that the vehicle drive train assembly 12 can include only a single nut or additional nuts as needed and/or required.

In the illustrated embodiment, the first and second nuts 22 and 24 are pre-welded to the propeller shaft 14 prior to installation to decrease the number of people needed to install the final drive 16 to the propeller shaft 14, as will be further described. However, it will be apparent to those skilled in the vehicle field from this disclosure that the first and second nuts 22 and 24 can be alternatively pre-welded to the final drive flange 20 to receive the first and second fasteners 26 and 28. Therefore, in the illustrated embodiment, the first and second nuts 22 and 24 is provided to a vehicle component V of the drive train assembly 12 (e.g., the propeller shaft 14 or the final drive 16).

The vehicle drive train assembly 12 of the illustrated embodiment further comprises a first fastener 26 and a second fastener 28 corresponding to the first and second nuts 22 and 24, respectively. Here, the first and second fasteners 26 and 28 are threaded fasteners (i.e., bolts). That is, the first and second nuts 22 and 24 threadedly receive the first and second fasteners 26 and 28 therethrough, respectively, to support the propeller shaft 14 and the final drive 16 to each other. However, it will be apparent to those skilled in the vehicle field from this disclosure that the vehicle drive train assembly 12 can include only a single fastener or additional fasteners as needed and/or required.

Referring to FIGS. 4 to 6, the propeller shaft 14 has at least one receiving opening 14A and 14B to receive the first fastener 26. In particular, the propeller shaft 14 has a pair of the receiving openings 14A and 14B that receive the first and second fasteners 26 and 28, respectively. The final drive 16 has a pair of receiving openings 16A and 16B for receiving the first and second fasteners 26 and 28, respectively. The receiving openings 14A and 14B of the propeller shaft 14 and the receiving openings 16A and 16B of the final drive 16 are aligned to receive the first and second fasteners 26 and 28 therethrough. Also, the receiving openings 14A and 14B of the propeller shaft 14 and the receiving openings 16A and 16B of the final drive 16 are non-threaded openings.

That is, each of the receiving openings 14A and 14B of the propeller shaft 14 is aligned with one of the receiving openings 16A and 16B of the final drive 16. The first fastener 26 is received through one of the receiving openings 14A of the final drive 16 and one of the receiving openings 16B of the propeller shaft 14. The second fastener 28 is received through one of the receiving openings 14B of the final drive 16 and one of the receiving openings 16B of the propeller shaft 14.

While the propeller shaft 14 and the final drive 16 are illustrated as being attached to each other by the propeller shaft flange 18 and the final drive flange 20, it will be apparent to those skilled in the vehicle field from this disclosure that the propeller shaft 14 and the final drive 16 can be fixed to each other at other parts of the propeller shaft 14 and the final drive 16. That is, the fasteners 26 and 28 and the nuts 22 and 24 can be provided at other locations on the propeller shaft 14 and the final drive 16, as needed and/or necessary.

Figure 7:
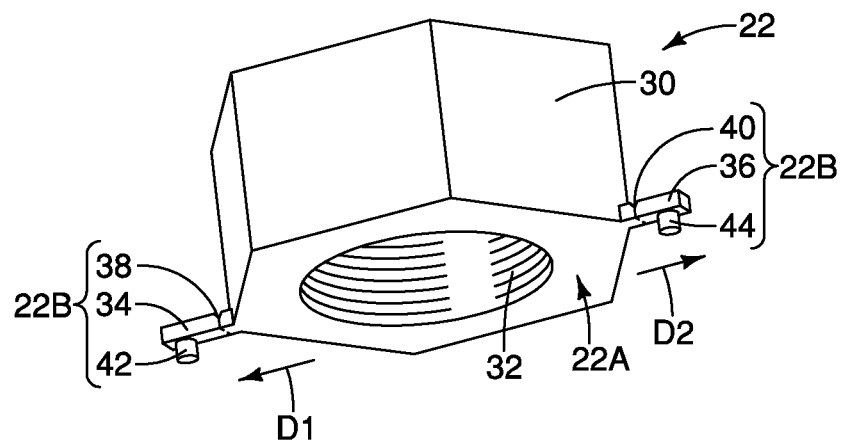
FIG. 7 is a bottom perspective view of one of the nuts of the drive train assembly.
Figure 8:
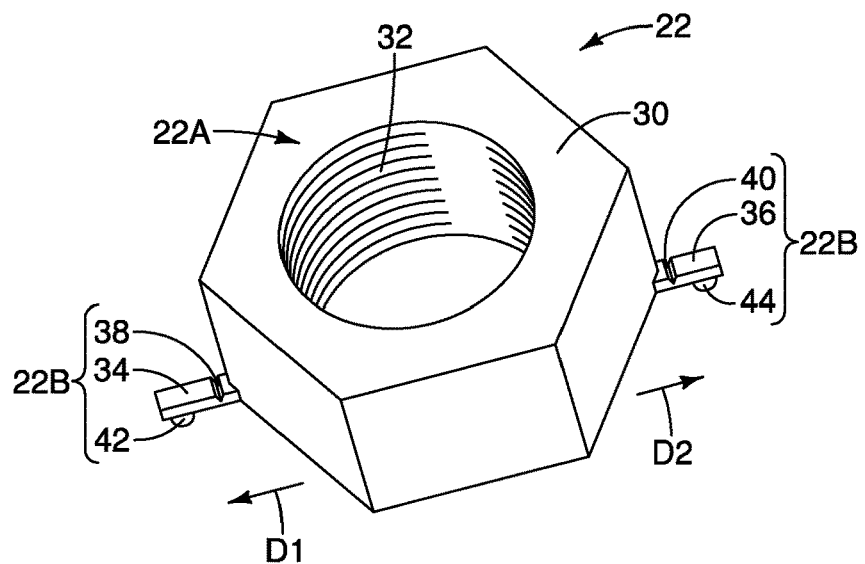
FIG. 8 is a top perspective view of the nut of the drive train assembly illustrated in FIG. 7.

The first and second nuts 22 and 24 will now be discussed with reference to FIGS. 6 to 8. Because the first and second nuts 22 and 24 are identical in structure, only the first nut 22 will be further discussed for brevity. (For brevity, the reference numerals for the components of the first nut 22 further described herein will be adopted in the Figures for the second nut 24 as these components are identical in structure and purpose). The first nut 22 has a main body 30 having a threaded opening 32 that is aligned to the receiving opening 14A of the propeller shaft 14 to receive the first fastener 26 therethrough. In particular, the main body 30 has the threaded opening 32 for threadedly receiving a threaded shaft of the first fastener 26. As best seen in FIGS. 7 and 8, the first nut 22 includes a first extension 34 extending from the main body 30 in a first direction D1. The first nut 22 includes a second extension 36 extending from the main body 30 in a second direction D2. The second direction D1 is opposite with respect to the first direction D2.

The main body 30 defines a first part 22A of the first nut 22. The first and second extensions 34 and 36 define a second part 22B of the first nut 22. Therefore, the first nut 22 has the first part 22A and the second part 22B. In other words, the second part 22B includes at least one extension 34 and 36 extending laterally from the main body 30. The second part 22B of the first nut 22 includes the first and second extensions 34 and 36. That is, the first and second extensions 34 and 36 extend laterally from the main body 30 at opposite sides of the main body 30 with respect to each other.

As stated, in the illustrated embodiment, the first nut 22 is pre-welded to the propeller shaft flange 18, as seen in FIG. 4. In particular, the first and second extensions 34 and 36 are configured to be pre-attached to a vehicle component V of the drive train assembly 12 (e.g., the propeller shaft 14 or the final drive flange 20). Alternatively speaking, the first nut 22 is already supported to the propeller shaft 14 prior to the propeller shaft 14 being installed to the final drive 16 to eliminate the need to hold onto the first nut 22 during installation with the final drive 16. Therefore, in the illustrated embodiment, the propeller shaft 14 is provided having the first nut 22 pre-attached thereon. Preferably, as shown, the first nut 22 is pre-attached to the propeller shaft 14 at the propeller shaft flange 18. That is, the first nut 22 is pre-attached to the propeller shaft flange 18 by the first and second extensions 34 and 36. As shown, the propeller shaft 14 is provided having the second nut 24 pre-attached thereon identically to the first nut 22.

As shown in FIGS. 5 and 6, the main body 30 is breakable from the first and second extensions 34 and 36 when the first nut 22 moves from an uninstalled position to an installed position to the propeller shaft 14. In the illustrated embodiment, the main body 30 is movable with respect to the propeller shaft 14 between an uninstalled position (FIGS. 4 and 5) and an installed position (FIG. 6) of the nut. That is, the main body 30 of the first nut 22 is rotated by the installer once the threaded opening 32 receives the threaded shaft of the first fastener 26. In other words, the installer screws the first fastener 26 through the threaded opening 32. Then the first nut 22 is tightened to the first fastener 26 by rotating the first nut 22 into the installed position. The main body 30 then separates from the first and second extensions 34 and 36 once it is rotated into the installed position, as shown in FIG. 6.

Therefore, the first and second extensions 34 and 36 are stationary with respect to the propeller shaft 14 in both the uninstalled position and the installed position. In the illustrated embodiment, main body 30 (e.g., the first part 22A) is attached to the first and second extensions 34 and 36 (e.g., the second part 22B) in the uninstalled position (FIG. 5). In the illustrated embodiment, the main body 30 (e.g., the first part 22A) is detached from the first and second extensions 34 and 36 (e.g., the second part 22B) in the installed position of the first nut 22 (FIG. 6).

Referring to FIGS. 7 and 8, the main body 30 is connected to the first extension 34 by a first frangible portion 38. The main body 30 separates from the first extension 34 at the first frangible portion 38 when the main body 30 moves from the installed position to the installed position. The main body 30 is connected to the second extension 36 by a second frangible portion 40. The main body 30 separates from the second extension 36 at the second frangible portion 40 when the main body 30 moves from the installed position to the installed position. That is, the first and second frangible portions 38 and 40 are weakened portions along the first and second extensions 34 and 36 so that the main body 30 can break away from the first and second extensions 34 and 36 when rotated during installation.

In the illustrated embodiment, each of the first and second extensions 34 and 36 preferably has a length that is approximately 0.75 times a length of an overall diameter of the main body 30. Each of the first and second extensions 34 and 36 preferably has a width that is approximately 0.2 times the overall diameter of the main body 30. Each of the first and second extensions 34 and 36 also preferably has a thickness that is 0.1 times the overall diameter of the main body 30. The first and second extensions 34 and 36 are preferably made of flattened sheets of metal.

In the illustrated embodiment, the first and second frangible portions 38 and 40 include indentations (e.g., thinner sections) along the first and second extensions 34 and 36 so that the main body 30 is separated from the first and second extensions 34 and 36 at the indentations. It will be apparent to those skilled in the vehicle field from this disclosure that the frangible portions 38 and 40 can alternatively be perforations along the first and second extensions 34 and 36 or other weakened portions, as needed and/or preferred.

Each of the frangible portions 38 and 40 preferably has a width that is 0.1 times the overall diameter of the main body 30. In the illustrated embodiment, the frangible portions 38 and 40 are illustrated as extending across the first and second extensions 34 and 36. However, it will be apparent to those skilled in the vehicle field from this disclosure that the frangible portions 38 and 40 can just be slits along portions of the first and second extensions 34 and 36.

Referring to FIGS. 6 to 8, the first extension 34 includes a first protrusion 42 and the second extension 36 includes a second protrusion 44. In the illustrated embodiment, the first and second protrusions 42 and 44 are pre-welded to the propeller shaft flange 18. However, it will be apparent to those skilled in the vehicle field from this disclosure that the first and second extensions 34 and 36 can be directly pre-welded to the propeller shaft flange 18 without need for the first and second protrusions 42 and 44. In the illustrated embodiment, each of the first and second protrusions 42 and 44 preferably has a thickness that is twice the thickness of the first and second extensions 34 and 36, respectively.

With the arrangement of the first and second nuts 22 and 24 with respect to the propeller shaft flange 18, the final drive flange 20 and the first and second fasteners 26 and 28, the drive train assembly 12 has a desired loosening resistance of the first and second fasteners 26 and 28 with respect to the propeller shaft 14 and the final drive 16. That is, the first and second fasteners 26 and 28 have a desired loosening resistance. This accomplished by the distance between the first and second fasteners 26 and 28, a spring characteristic of the propeller shaft flange 18 and the final drive flange 20, a tightening torque of the first and second nuts 22 and 24 to the first and second fasteners 26 and 28, and a bearing area that is a contact area of the first and second nuts 22 and 24 to the propeller shaft flange 18. The spring characteristic refers to a spring tension between the propeller shaft flange 18 and the final drive flange 20. These factors that maintain a desired loosening resistance are maintained by the first and second nuts 22 and 24 being pre-welded to the propeller shaft flange 18 to accomplish an ease of installation of the fasteners 26 and 28 to the drive train assembly 12.

Figure 9:
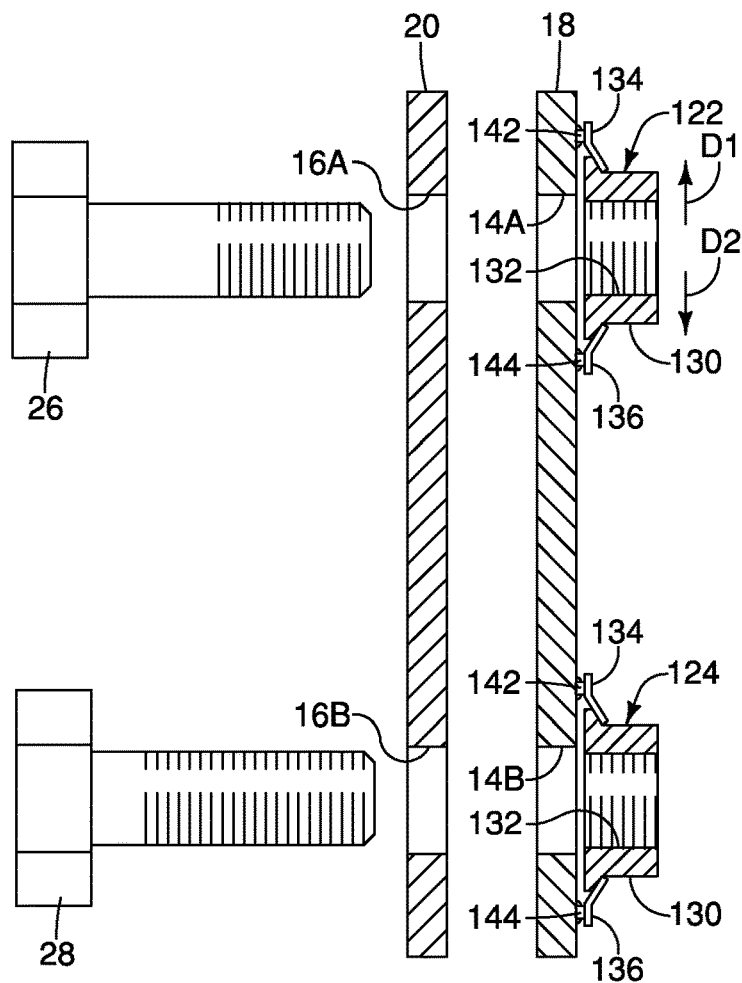
FIG. 9 is a simplified cross-sectional view, similar to FIG. 4, of the propeller shaft flange and the final drive flange of the drive train assembly but with a modified nut installed to the propeller shaft flange.

Referring to FIG. 9, a first and second modified nut 122 and 124 are illustrated in accordance with an illustrated embodiment. The modified nuts 122 and 124 can be supported to the propeller shaft flange 18 in the same way as the first and second nuts 22 and 124. That is, the first and second modified nuts 122 and 124 can be pre-welded to the propeller shaft flange 18. The first and second modified nuts 122 and 124 are identical with respect to each other. Therefore, only the first modified nut 122 will be discussed for brevity. Due to the similarity between the first modified nut 122 and the nut 22, the first modified nut 122 will receive the same reference numerals as the first nut 22 but increased by 100.

The modified nut 122 includes a main body 130 having a threaded opening 132 that receives the fastener 26 therethrough. The main body 130 defines a first part 122A of the first modified nut 122. The modified nut 122 has a pair of first and second extensions 134 and 136 extending from the main body 130 in opposite directions. The first and second extensions 134 and 136 define a second part 122B of the first modified nut 122. The first and second extensions 134 and 136 extend from the main body 130 at an angle with respect to the main body 130. The first and second extensions 134 and 136 include protrusions 142 and 144 respectively that are welded to the propeller shaft flange 18.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle drive train assembly. Accordingly, these terms, as utilized to describe the present invention should be interpreted relative to a vehicle equipped with the vehicle drive train assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle drive train assembly comprising:
   a propeller shaft; and
   a nut having a first part and a second part, the first part being a main body having a fastener receiving opening, the main body being movable with respect to the propeller between an uninstalled position and an installed position of the nut, the first part being rotated when moving from the uninstalled to the installed position, the second part having a first extension and a second extension extending from the main body in substantially opposite directions with respect to each other, the first and second extensions each having a maximum width that is less than a maximum width of the main body, the first extension having a first frangible portion and the second extension having a second frangible portion, the first and second extensions being stationary with respect to the propeller shaft in the uninstalled position in which the first and second frangible portions are intact and the installed position in which the main body separates from the first and second frangible portions at the first and second frangible portions, the first part being attached to the second part in the uninstalled position, the first part being detached from the second part in the installed position of the nut.

2. The vehicle drive train assembly in accordance with claim 1, wherein
   the propeller shaft has a first receiving opening for receiving a first fastener, the fastener receiving opening of the main body is a second opening that is aligned to the first receiving opening of the propeller shaft to receive the first fastener therethrough.

3. The vehicle drive train assembly in accordance with claim 2, further comprising
   a final drive having a third receiving opening for receiving the first fastener therethrough.

4. The vehicle drive train assembly in accordance with claim 3, wherein
   the first receiving opening is located on a propeller shaft flange, the third receiving opening is located on a drive shaft flange.

5. The vehicle drive train assembly in accordance with claim 4, further comprising
   the first fastener extending through the first, second and third receiving openings.

6. The vehicle drive train assembly in accordance with claim 5, wherein
   the propeller flange includes a fourth receiving opening, and the final drive flange includes a fifth receiving opening that is aligned with the fourth receiving opening.

7. The vehicle drive train assembly in accordance with claim 6, wherein
   the nut is a first nut and the vehicle drive train further comprises a second nut that is aligned with the third and fourth receiving openings for receiving a second fastener therethrough.

8. The vehicle drive train assembly in accordance with claim 7, wherein
   the second nut is at least partially pre-welded to the propeller shaft.

9. The vehicle drive train assembly in accordance with claim 1, wherein
   the second part is at least partially welded to the propeller shaft.

10. The vehicle drive train assembly in accordance with claim 1, wherein the first and second extensions are at least partially welded to the propeller shaft to remain stationary with respect to the propeller shaft in the uninstalled and installed positions.

11. A nut configured to be welded to a vehicle component, the nut comprising:
a main body having a threaded opening for receiving a first fastener;
a first extension extending from the main body in a first direction; and
a second extension extending from the main body in a second direction, the second direction being opposite with respect to the first direction, the first and second extensions are configured to be welded to the vehicle component, the first extension having a first frangible portion and the second extension having a second frangible portion, the first and second extensions each having a maximum width that is less than a maximum width of the main body, the main body is breakable from the first and second extensions at the first and second frangible portions respectively when the nut moves from an installed position to an installed position to the vehicle component, the main body being rotated when moving from the uninstalled to the installed position, the main body being spaced from the vehicle component when in the uninstalled position and contacting the vehicle component when in the installed position.

* * * * *